(12) United States Patent
Oobuchi et al.

(10) Patent No.: US 6,379,805 B1
(45) Date of Patent: Apr. 30, 2002

(54) LOW TEMPERATURE-FIRED PORCELAIN ARTICLES AND ELECTRONIC PARTS INCLUDING SUCH PORCELAIN ARTICLES

(75) Inventors: Takeshi Oobuchi, Nagoya; Yasunori Kouda, Inuyama; Hideyuki Baba, Nagoya, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/487,131

(22) Filed: Jan. 19, 2000

(30) Foreign Application Priority Data

Jan. 22, 1999 (JP) .......................... 11-014350
Jan. 22, 1999 (JP) .......................... 11-014351

(51) Int. Cl.[7] .................. C03C 3/091; C03C 3/064; B32B 9/00
(52) U.S. Cl. .................. 428/446; 428/212; 428/697; 428/699; 428/701; 428/702; 501/66; 501/70; 501/77; 501/78
(58) Field of Search .................. 501/55, 65–69, 501/75, 77, 79, 94, 123, 125, 126, 127, 128; 428/446, 689, 697, 699, 701, 702, 212

(56) References Cited

U.S. PATENT DOCUMENTS 4,732,794 A * 3/1988 Hyde .................. 428/210
5,137,848 A * 8/1992 Barker et al. .................. 501/18
5,858,893 A * 1/1999 Yamamoto et al. .................. 501/32
5,994,253 A * 11/1999 Sasaki et al. .................. 501/139
6,140,891 A * 10/2000 Nakakubo et al. .................. 333/204

FOREIGN PATENT DOCUMENTS

| JP | 56 073646 A | 6/1981 |
|---|---|---|
| JP | 04 016551 A | 1/1992 |
| JP | 5-243810 | 9/1993 |
| JP | 7-98679 | 10/1995 |

* cited by examiner

Primary Examiner—Deborah Jones
Assistant Examiner—Stephen Stein
(74) Attorney, Agent, or Firm—Burr & Brown

(57) ABSTRACT

A low temperature-fired porcelain article includes a barium component in an amount of 40 to 65 wt % when calculated as BaO, a silicon component in an amount of 25 to 46 wt % when calculated as $SiO_2$, an aluminum component in an amount of 0.1 to 20 wt % when calculated as $Al_2O_3$, a boron component in an amount of 0.3 to 1.5 wt % when calculated as $B_2O_3$, and a zinc component in an amount of 0.5 to 20 wt % when calculated as ZnO, optionally also a chromium component in an amount of 0.5 to 3.5 wt % when calculated as $Cr_2O_3$ wherein the porcelain article has a dielectric constant ∈r of not more than 10, a quality coefficient Q of not less than 2500, and preferably has an absolute value of a temperature coefficient τf of the resonance frequency of not more than 30 ppm/° C.

8 Claims, No Drawings

LOW TEMPERATURE-FIRED PORCELAIN ARTICLES AND ELECTRONIC PARTS INCLUDING SUCH PORCELAIN ARTICLES

BACKGROUND OF THE INVENTION (1) Field of the Invention

The present invention relates to low temperature-fired porcelain articles having a low dielectric constant and a high quality coefficient Q, and to electronic parts using such porcelain articles.

(2) Related Art Statement

In the high frequency circuit radio instruments such as cellular phones, top filters, interstage filters, local filters, etc. are used as high frequency circuit filters, and a laminated type dielectric filter is used as an interstage filter. An example of such a laminated type dielectric filter is disclosed in JP-A 5-243,810.

In order to produce the dielectric-laminated filter, a plurality of green sheets are produced from a powdery ceramic material to constitute a dielectric, a given electrode pattern is formed on each of the green sheets by printing with a given conductive paste. Then, a laminate is obtained by laminating the resulting green sheets, and the laminate is fired so that the conductive paste layers and the green sheets are simultaneously fired to densify the laminate.

At that time a metallic conductor having a low melting point, such as a silver-based conductor, a copper-based conductor or a nickel-based conductor is generally used as the electrode, their melting points are not more than 1,100° C., for example, and sometimes as low as around 930° C. For this reason, the dielectric needs to be sintered at a firing temperature lower than the low melting point metal constituting the electrode.

In order to decrease stray capacity, shorten the delay time and reduce the high frequency loss of an oscillator and a condenser housed, it is desired that the low temperature-fired porcelain article has a decreased dielectric constant $\in r$ and an increased quality coefficient Q. However, low temperature-fired porcelain articles having the optimum fired temperature of not more than 1,000° C., a dielectric constant of not more than 10, a quality coefficient Q of not less than 2500, and an absolute value of a temperature coefficient τf of the resonance frequency of not more than 30 ppm/°C. have not been available.

For example, in order to provide a low temperature-fired porcelain article capable of being fired at a low temperature and having a wide optimum firing temperature range, a high insulating resistance and a low dielectric constant $\in r$, JP-B 7-98,679 proposes a low temperature-fired porcelain article containing an aluminum component in an amount of 2.0 to 10.0 wt % when calculated as $Al_2O_3$, a barium component in an amount of 20.0 to 50.0 wt % when calculated as $BaCO_3$, a silicon component in an amount of 40 to 70 wt % when calculated as $SiO_2$, a boron component in an amount of 1.0 to 3.0 wt % when calculated as $B_2O_3$, a chromium component in an amount of 0.3 to 3.0 wt % when calculated as $Cr_2O_3$, and a calcium component in an amount of 0.3 to 3.0 wt % when calculated as $CaCO_3$. However, no measure has been recognized to control the quality coefficient Q of the low temperature-fired porcelain to not less than 2500, and porcelain articles which can be fired at optimum firing temperatures of not more than 1,000° C. have not been realized.

On the other hand, alumina and a glass-epoxy compound are used as materials for multi-layer wired substrates with low dielectric constants.

The present inventors have tried to incorporate condensers or inductors in multi-layer wired substrates made of materials having low dielectric constants. However, since the temperature coefficient τf of the resonance frequency of alumina or glass-epoxy compounded substrates is less than −60 ppm/° C., the alumina substrates or the glass-epoxy compounded substrates could not be employed for the condensers or the inductors requiring temperature compensation with high accuracy. On the other hand, low temperature-fired, $BaO$—$SiO_2$—$Al_2O_3$-based porcelain articles have their optimum firing temperatures of not more than 1,000° C., porcelain articles having the dielectric constants of not more than 10 and the quality coefficient of not less than 2500 have not been offered. In addition, no examination has been made upon τf.

In order to provide low temperature-fired porcelain articles which enable low temperature firing with a wide optimum firing temperature range and possess high insulation resistance and low dielectric constants, for example, JP-B 7-98,679 proposes a low temperature-fired porcelain article that contains 2.0 to 10.0 wt % of an aluminum component when calculated as $Al_2O_3$, 20.0 to 50.0 wt % of a barium component when calculated as $BaCO_3$, 40.0 to 70.0 wt % of a silicon component when calculated as $SiO_2$, 1.0 to 3.0 wt % of a boron component when calculated as $B_2O_3$, 0.3 to 3.0 wt % of a chromium component when calculated as $Cr_2O_3$, and 0.3 to 3.0 wt % of a calcium component when calculated as $CaCO_3$. However, a method has not been recognized to control the quality coefficient Q of the low temperature-fired porcelain article to not less than 2500. Further, a porcelain article which has the quality coefficient Q of not less than 2500 and which can be fired at an optimum firing temperature of not more than 950° C. has not been realized. Furthermore, a method has not been described to lessen an absolute value of the temperature coefficient τf of the resonance frequency of the low temperature-fired porcelain article.

SUMMARY OF THE INVENTION

It is an object of a first aspect of the present invention to provide a low temperature-fired $BaO$—$SiO_2$—$Al_2O_3$ based porcelain article having a dielectric constant of not more than 10 and a quality coefficient Q of 2,500. The quality coefficient Q is measured by the Hakki-Coleman method.

The low temperature-fired porcelain article according to the first aspect of the present invention comprises a barium component in an amount of 40 to 65 wt % when calculated as BaO, a silicon component in an amount of 25 to 46 wt % when calculated as $SiO_2$, an aluminum component in an amount of 0.1 to 20 wt % when calculated as $Al_2O_3$, a boron component in an amount of 0.3 to 1.5 wt % when calculated as $B_2O_3$, and a zinc component in an amount of 0.5 to 20 wt % when calculated as ZnO, wherein the porcelain article has a dielectric constant τr of not more than 10, and a quality coefficient Q of not less than 2500.

It is an object of a second aspect of the present invention to provide a low temperature-fired, $BaO$—$SiO_2$—$Al_2O_3$ based porcelain article having a dielectric constant $\in r$ of not more than 10, a quality constant of not less than is 2500 and an absolute value of a temperature coefficient τf of a resonance frequency of not more than 30 ppm/°C. with high strength.

The low temperature-fired porcelain article comprises a barium component in an amount of 40 to 65 wt % when calculated as BaO, a silicon component in an amount of 25 to 46 wt % when calculated as $SiO_2$, an aluminum component in an amount of 0.2 to 20 wt % when calculated as $Al_2O_3$, a boron component in an amount of 0.3 to 1.5 wt % when calculated as $B_2O_3$, a chromium component in an amount of 0.5 to 3.5 wt % when calculated as $Cr_2O_3$, and a zinc component in an amount of 0.5 to 20 wt % when calculated as ZnO, wherein the porcelain article has a dielectric constant ∈r of not more than 10, a quality coefficient Q of not less than 2500 and an absolute value of a temperature coefficient f of a resonance frequency of not more than 30 ppm/°C.

The following description on the zinc component, the silicon component, the aluminum component, and the boron component is also applicable to the porcelain articles according to the first and second aspects of the present invention.

When the zinc component is incorporated in an amount of not less than 0.5 wt % as calculated in the form of ZnO, the coefficient of thermal expansion of the low temperature-fired article decreases, and can be easily sintered, which enables firing at a low temperature. When the zinc component is not more than 20 wt %, reduction in the quality coefficient Q can be prevented.

When the silicon component is incorporated in an amount of not less than 25 wt % as calculated in the form of $SiO_2$, the dielectric constant ∈r can be controlled to not more than 10. When it is in an amount of not more than 46 wt %, the porcelain article can be fired at a low temperature.

When the aluminum component is incorporated in an amount of not less than 0.1 wt % (particularly preferably not less than 2) as calculated in the form of $Al_2O_3$, a celsian phase having high strength can be increased in the porcelain article, and the strength of a substrate made of such a porcelain article can be increased to 2,000 kg/cm². When the content of the aluminum component is not more than 20 wt % (particularly preferably not more than 15 wt %), low temperature firing is possible.

When the boron component is incorporated in an amount of not more than 1.5 wt % (particularly preferably not more than 1.0 wt %) as calculated in the form of $B_2O_3$, the quality coefficient Q can be not less than 2,500. It has not been known that the quality coefficient Q of the porcelain article can be increased by decreasing the content of the boron component in the $BaO—SiO_2—Al_2O_2$ based low temperature fired porcelain ceramic material like this, when the porcelain article can be obtained by firing at a low temperature. When the boron component is incorporated in an amount of not less than 0.3 wt % (particularly preferably not less than 0.5 wt %), the porcelain article can be obtained by firing at a low temperature.

When the chromium component is incorporated in an amount of not less than 0.5 wt % (particularly preferably not less than 1 wt % when calculated as $Cr_2O_3$), the temperature coefficient τf of the resonance frequency can be controlled to not more than 30 ppm/°C. and the optimum firing temperature for the low temperature-fired porcelain article can be decreased. When the chromium component is incorporated in an amount of not more than 3.5 wt % (particularly preferably not more than 2.5 wt % when calculated as $Cr_2O_3$), the temperature coefficient τf of the resonance frequency can be controlled to not more than 30 ppm/°C.

As mentioned above, the first aspect of the present invention succeeded in maintaining at a high level of not less than 2,500 the quality coefficient Q of the low temperature-fired porcelain having a low dielectric constant ∈r by incorporating the boron component and the zinc component in an appropriate combination of their addition amounts, while maintaining the sinterability at the low temperature.

As mentioned above, the second aspect of the present invention succeeded in maintaining at a high level of not less than 2,500 the quality coefficient Q of the low temperature-fired porcelain having a low dielectric constant ∈r by incorporating the boron component, the chromium component and the zinc component in an appropriate combination of their addition amounts and also in decreasing the absolute value of the temperature coefficient τf of the resonance frequency to not more than 30 ppm/°C., while maintaining the sinterability at the low temperature.

Further, according to the low temperature-fired porcelain articles of the first and second aspects of the present invention, mainly the addition of the zinc component decreases the coefficient of thermal expansion of the porcelain article, and makes the firing shrinkage factor in a temperature range of 500 to 800° C. close to that of a low temperature-fired porcelain article having a higher dielectric constant ∈r. As a result, if a laminate is obtained by laminating a green sheet to produce the low temperature-fired porcelain article according to any one of the first and second aspects of the present invention as a first low dielectric constant layer and a second green sheet to produce another low temperature-fired porcelain article having a dielectric constant of 10 to 150 higher than that of the first layer, and a joint body is obtained by firing the laminate, the resulting substrate fired is free from warping and peeling at a joining interface.

Therefore, a second object of the present invention is to provide an electronic part comprising a first low dielectric constant layer made of the low temperature-fired porcelain article according to anyone of the first and second aspects of the present invention, and a second dielectric layer joined to the first dielectric layer, wherein the second dielectric layer has a dielectric constant ∈r of 10 to 150 which is larger than that of the first layer. The ∈r of 10 to 150 means that the electronic part has a large condenser capacity, that a wavelength-shortening effect of the resonance frequency is large and that τf may be smaller than 30 ppm/°C.

As the low temperature-fired porcelain article constituting the second dielectric layer, the following are particularly preferable.

$BaO—TiO_2—ZnO—SiO_2—B_2O_3$ $BaO—TiO_2—Bi_2O_3—Nd_2O_3—ZnO—SiO_2—B_2O_3$ $BaO—TiO_2—Bi_2O_3—La_2O_3—Sm_2O_3—ZnO—SiO_2—B_2O_3$ $MgO—CaO—TiO_2—ZnO—Al_2O_3—SiO_2—B_2O_3$

The electronic parts targeted by the present invention are not particularly limited, but laminated dielectric filters, multi-layered circuit boards, dielectric antennas, dielectric couplers, dielectric composite modules, etc. are recited by way of example.

These and other objects, features and advantages of the invention will be appreciated upon reading of the following description of the invention, with the understanding that some modifications, variations and changes could be made by the skilled person in the art to which the invention pertains.

DETAILED DESCRIPTION OF THE INVENTION

In the following, the first aspect of the present invention will be explained in more detail.

In order to produce the low temperature-fired porcelain article according to the present invention, it is preferable that starting materials for the respective reagents are mixed in a given ratio to obtain a mixed powder, the mixed powder is calcined at 1,000 to 1,200° C., the resulting calcined powder is crushed to obtain a ceramic powder. Preferably, a green sheet is formed by using the ceramic powder and a glass powder composed of $SiO_2$, $B_2O_3$ and ZnO, and the green sheet is fired at 850 to 930° C. As the starting materials for the respective metallic oxide components, an oxide, a nitrate, a carbonate, a sulfate or the like of each of the metals may be used.

EXAMPLES

Zinc oxide, alumina, barium carbonate and silicon oxide were weighed, and wet mixed to obtain a mixed powder, which was calcined at 1,000 to 1,200° C., and the calcined powder was crushed, thereby obtaining a ceramic powder.

On the other hand, respective powder of zinc oxide, boron oxide and silicon oxide were weighed, and dry mixed, and the resulting mixed powder was melted in a platinum crucible. The melt was fed into water to be rapidly cooled, thereby obtaining a massy glass. This glass was crushed, thereby obtaining glass powder having a low melting point.

The ceramic powder and the glass powder thus obtained were mixed by using an alumina pot and alumina balls together with an organic binder, a plasticizer, a dispersant and an organic solvent, thereby obtaining a slurry. A green sheet, 0.03 to 2 mm wide, was formed from this slurry with a doctor blade device.

With respect to Experimental samples Nos. 1-1 to 1-21 having respective compositions shown in Table 1, the optimum firing temperature, the dielectric constant ∈r, the quality coefficient Q and strength were measured. The capacitor patterns and the resonators patterns were screen printed on each of the green sheets, and a predetermined number of the green sheets were laminated. The laminate was fired, and worked to obtain an experimental sample. With respect to each of the thus obtained experimental samples, the dielectric constant ∈r and the quality coefficient Q were measured. The optimum firing temperature was so set that a change in the dielectric constant ∈r relative to a change in the firing temperature might be not more than 0.1/° C. With respect to each of the experimental samples, strength was measured according to JIS-R1601 "Testing Method for Flexural Strength of High Performance Ceramics". Measurement results obtained are shown in Table 1.

In Experiment Nos. 1-1 to 1-5, mainly the amount of zinc oxide was changed. In Experiment No. 1-1, the amount of zinc oxide is 0.3 wt %, the proper firing temperature is high. In Experiment No. 1-5, the amount of zinc oxide was 25 wt %, but the dielectric constant ∈r is high.

In Experiment Nos. 1-6 to 1-9, mainly the amount of aluminum oxide was changed. In Experiment Nos. 1-10 to 1-13, mainly the amount of barium oxide was changed. In Experiment Nos. 1-14 to 1-18, mainly the amount of silicon oxide was changed, and a proper firing temperature was high in Experiment No. 1-18. In Experiment Nos. 1-18 to 1-21, mainly the amount of boron oxide was changed, and it was found that the proper firing temperature rose and the quality coefficient Q remarkably rose as the amount of boron oxide decreased.

Next, a coefficient of thermal expansion (/°C.) was measured at 25 to 800° C. with respect to each of the experimental samples.

A green sheet for another, second low temperature-firing porcelain article to be joined was prepared, which had a composition of 0.3 wt % of ZnO, 3.5 wt % of $Al_2O_3$, 52 wt % of BaO, 43 wt % of $SiO_2$ and 1.2 wt % of $B_2O_3$. A predetermined number of such green sheets were laminated, the laminate was fired at 920° C., and the fired body worked, thereby obtaining a experimental sample. With respect to this experimental sample, a coefficient of thermal expansion (/°C.) was measured in a range of 25 to 800° C. A difference in coefficient of thermal expansion between the low temperature-fired porcelain article in each Experimental sample according to the present invention and said another low temperature-fired porcelain article to be joined thereto was measured.

With respect to each of the green sheets in Experiment Nos. 1-1 to 1-21 in Table 1 and the green sheet for another low temperature-fired porcelain article to be joined thereto, a firing shrinkage factor between room temperature and 800° C. was measured by a dilatometer, and the maximum difference in the firing shrinkage ratio was measured. The green sheet in each of Experiment of Experiment Nos. 1-1

TABLE 1

| Experiment No. | Content (wt %) | | | | | Proper firing temperature (° C.) | ∈r | Q | Strength kg/cm² |
|---|---|---|---|---|---|---|---|---|---|
| | ZnO | $Al_2O_3$ | BaO | $SiO_2$ | $B_2O_3$ | | | | |
| 1-1 | 0.3 | 3.5 | 52 | 43 | 1.2 | 940 | 7.2 | 2000 | 2500 |
| 1-2 | 0.5 | 3.6 | 52 | 43 | 0.9 | 920 | 7.1 | 2900 | 2500 |
| 1-3 | 10 | 3.2 | 47 | 39 | 0.8 | 910 | 7.5 | 3200 | 2500 |
| 1-4 | 20 | 1 | 43 | 35 | 1.0 | 895 | 7.8 | 2800 | 2200 |
| 1-5 | 25 | 1.2 | 40 | 33 | 0.8 | 890 | 8.4 | 2200 | 2200 |
| 1-6 | 10.6 | 0.1 | 48 | 40 | 1.3 | 905 | 7.6 | 2500 | 2100 |
| 1-7 | 10 | 1 | 48 | 40 | 1.0 | 910 | 7.6 | 2800 | 2300 |
| 1-8 | 4 | 10.1 | 47 | 38 | 0.9 | 915 | 7.5 | 2800 | 2900 |
| 1-9 | 3 | 20 | 41 | 35 | 1.0 | 925 | 7.8 | 2800 | 3200 |
| 1-10 | 3 | 9.8 | 40 | 46 | 1.2 | 910 | 7.6 | 2500 | 2800 |
| 1-11 | 3 | 8.1 | 44 | 44 | 0.9 | 920 | 7.5 | 2800 | 2800 |
| 1-12 | 2 | 1.1 | 55 | 41 | 0.9 | 915 | 7.6 | 2800 | 2200 |
| 1-13 | 3 | 3.2 | 65 | 28 | 0.8 | 920 | 8.0 | 3000 | 2500 |
| 1-14 | 3 | 5.6 | 65 | 25 | 1.4 | 910 | 8.2 | 2500 | 2600 |
| 1-15 | 3 | 3.5 | 58 | 35 | 0.5 | 920 | 7.8 | 3700 | 2500 |
| 1-16 | 8 | 1.2 | 47 | 43 | 0.8 | 915 | 7.4 | 2900 | 2200 |
| 1-17 | 3 | 4.1 | 46 | 46 | 0.9 | 915 | 7.3 | 2700 | 2600 |
| 1-18 | 3 | 3.7 | 45 | 48 | 0.3 | 925 | 7.3 | 3900 | 2500 |
| 1-19 | 3 | 3.6 | 48 | 45 | 0.4 | 920 | 7.3 | 3800 | 2500 |
| 1-20 | 3 | 3.1 | 48 | 45 | 0.9 | 915 | 7.3 | 2700 | 2400 |
| 1-21 | 3 | 3.6 | 49 | 43 | 1.4 | 905 | 7.2 | 2500 | 2500 | to 1-21 (Table 1) was laminated with the corresponding green sheet for another low temperature-fired porcelain article to be joined thereto one upon another, and the laminate was fired at 850 to 930° C. to obtain a sintered laminate body. With respect to each of the thus sintered laminate bodies, the presence of warping and cracking and peeling at an interface of the laminated layers was detected. Results obtained are shown in Table 2.

invention, it is preferable that starting materials for the respective reagents are mixed in a given ratio to obtain a mixed powder, the mixed powder is calcined at 1,000 to 1,200° C., the resulting calcined powder is crushed to obtain a ceramic powder. Preferably, a green sheet is formed by using the ceramic powder and a glass powder composed of $SiO_2$, $B_2O_3$ and ZnO, and the green sheet is fired at 850 to 930° C. As the starting materials for the respective metallic

TABLE 2

| Experiment No. | Content (wt %) | | | | | Difference in coefficient of thermal expansion ppm/° C. | Difference in shrinkage factor during firing step (%) | Warping μm/cm | Cracking |
|---|---|---|---|---|---|---|---|---|---|
| | ZnO | $Al_2O_3$ | BaO | $SiO_2$ | $B_2O_3$ | | | | |
| 1-1 | 0.3 | 3.5 | 52 | 43 | 1.2 | 2.5 | 3.0 | 100 | cracked |
| 1-2 | 0.5 | 3.6 | 52 | 43 | 0.9 | 2.0 | 2.0 | 10 | not cracked |
| 1-3 | 10 | 3.2 | 47 | 39 | 0.8 | 0.5 | 0.5 | 5 | not cracked |
| 1-4 | 20 | 1 | 43 | 35 | 1.0 | −0.5 | 1.0 | 5 | not cracked |
| 1-5 | 25 | 1.2 | 40 | 33 | 0.8 | −1.0 | 2.0 | peeled | — |
| 1-6 | 10.6 | 0.1 | 48 | 40 | 1.3 | 0.5 | 0.5 | 5 | not cracked |
| 1-7 | 10 | 1 | 48 | 40 | 1.0 | 0.5 | 0.5 | 5 | not cracked |
| 1-8 | 4 | 10.1 | 47 | 38 | 0.9 | 1.5 | 1 | 5 | not cracked |
| 1-9 | 3 | 20 | 41 | 35 | 1.0 | 1.4 | 1 | 5 | not cracked |
| 1-10 | 3 | 9.8 | 40 | 46 | 1.2 | 1.4 | 1 | 5 | not cracked |
| 1-11 | 3 | 8.1 | 44 | 44 | 0.9 | 1.4 | 1 | 5 | not cracked |
| 1-12 | 2 | 1.1 | 55 | 41 | 0.9 | 1.7 | 1 | 5 | not cracked |
| 1-13 | 3 | 3.2 | 65 | 28 | 0.8 | 1.4 | 1 | 5 | not cracked |
| 1-14 | 3 | 5.6 | 65 | 25 | 1.4 | 1.4 | 1 | 5 | not cracked |
| 1-15 | 3 | 3.5 | 58 | 35 | 0.5 | 1.4 | 1 | 5 | not cracked |
| 1-16 | 8 | 1.2 | 47 | 43 | 0.8 | 0.8 | 1 | 5 | not cracked |
| 1-17 | 3 | 4.1 | 46 | 46 | 0.9 | 1.4 | 0.5 | 5 | not cracked |
| 1-18 | 3 | 3.7 | 45 | 48 | 0.3 | 1.4 | 1 | 5 | not cracked |
| 1-19 | 3 | 3.6 | 48 | 45 | 0.4 | 1.4 | 1 | 5 | not cracked |
| 1-20 | 3 | 3.1 | 48 | 45 | 0.9 | 1.4 | 1 | 5 | not cracked |
| 1-21 | 3 | 3.6 | 49 | 43 | 1.4 | 1.4 | 1 | 5 | not cracked |

As shown above, when the sintered laminate body is produced by using the low temperature-fired porcelain article according to the first aspect of the present invention, none of warping, peeling and cracking occur.

As mentioned above, according to the present invention, the $BaO—SiO_2—Al_2O_3$ based low temperature-fired porcelain article having the dielectric constant ∈r of not more than 10 and the quality coefficient Q of not less than 2500 with high strength can be obtained.

In the following, the second aspect of the present invention will be explained in more detail.

In order to produce the low temperature-fired porcelain article according to the second aspect of the present oxide components, an oxide, a nitrate, a carbonate, a sulfate or the like of each of the metals may be used.

EXAMPLES

Zinc oxide, alumina, barium carbonate and silicon oxide were weighed, and wet mixed to obtain a mixed powder, which was calcined at 1,000 to 1,200° C., and the calcined powder was crushed, thereby obtaining a ceramic powder.

On the other hand, respective powder of zinc oxide, boron oxide and silicon oxide were weighed, and dry mixed, and the resulting mixed powder was melted in a platinum crucible. The melt was fed into water to be rapidly cooled, thereby obtaining a massy glass. This glass was crushed, thereby obtaining glass powder having a low melting point.

The ceramic powder and the glass powder thus obtained were mixed by using an alumina pot and alumina balls together with an organic binder, a plasticizer, a dispersant and an organic solvent, thereby obtaining a slurry. A green sheet, 0.03 to 2 mm wide, was formed from this slurry with a doctor blade device.

With respect to Experimental samples Nos. 2-1 to 2-21 having respective compositions shown in Tables 3 and 4, the optimum firing temperature, the dielectric constant ∈r, the quality coefficient Q, strength and the absolute value of the temperature coefficient τf of the resonance frequency were measured. The capacitor patterns and the resonators patterns were screen printed on each of the green sheets, and a predetermined number of the green sheets were laminated. The laminate was fired, and worked to obtain an experimental sample. With respect to each of the thus obtained experimental samples, the dielectric constant ∈r, the quality coefficient Q and the absolute value of the temperature coefficient τf of the resonance frequency were measured. The optimum firing temperature was so set that a change in the dielectric constant ∈r relative to a change in the firing temperature might be not more than 0.1/° C. With respect to each of the experimental samples, strength was measured according to JIS-R1601 "Testing Method for Flexural Strength of High Performance Ceramics". The temperature coefficient was measured in a thermostat vessel by using the hakki-colleman method. Measurement results obtained are shown in Tables 3 and 4.

TABLE 3

| Experiment No. | Content (wt %) | | | | | | Proper firing temperature (° C.) | ∈r | Q | Strength kg/cm² | τf ppm/° C. |
| --- | --- | --- | --- | --- | --- | --- | --- | --- | --- | --- | --- |
| | ZnO | Al₂O₃ | BaO | Cr₂O₃ | SiO₂ | B₂O₃ | | | | | |
| 2-1 | 1.2 | 8 | 44 | 2.5 | 43 | 1.3 | 910 | 7.4 | 2500 | 2800 | −20~+20 |
| 2-2 | 4 | 4 | 50 | 1.5 | 39.5 | 1.0 | 910 | 7.6 | 2600 | 2500 | −3~+3 |
| 2-3 | 10 | 2.2 | 47 | 2.0 | 38 | 0.8 | 900 | 7.7 | 2500 | 2400 | −20~+20 |
| 2-4 | 20 | 2 | 45 | 1.0 | 31 | 1.0 | 890 | 8.0 | 2600 | 2400 | −30~+30 |
| 2-5 | 10 | 0.1 | 50 | 1.0 | 37.6 | 1.3 | 895 | 7.7 | 2500 | 2100 | −30~+30 |
| 2-6 | 8 | 1 | 48 | 2.5 | 39.6 | 0.9 | 905 | 7.6 | 2700 | 2300 | −20~+20 |
| 2-7 | 6 | 10 | 45 | 2.0 | 36.2 | 0.8 | 915 | 7.8 | 2900 | 2900 | −15~+15 |
| 2-8 | 4 | 15 | 44 | 1.5 | 35 | 0.5 | 920 | 7;8 | 3500 | 3100 | −3~+3 |
| 2-9 | 7 | 7.6 | 40 | 1.0 | 43 | 1.4 | 910 | 7.4 | 2500 | 2800 | −30~+30 |
| 2-10 | 5 | 6.1 | 46 | 2.0 | 40 | 0.9 | 910 | 7.6 | 2700 | 2600 | −15~+15 |
| 2-11 | 3 | 2.7 | 55 | 2.5 | 36 | 0.8 | 910 | 7.8 | 2900 | 2500 | −20~+20 |
| 2-12 | 2 | 1 | 65 | 1.5 | 30 | 0.5 | 920 | 8.0 | 3500 | 2300 | −3~+3 |

TABLE 4

| Experiment No. | Content (wt %) | | | | | | Proper firing temperature (° C.) | ∈r | Q | Strength kg/cm² | τf ppm/° C. |
| --- | --- | --- | --- | --- | --- | --- | --- | --- | --- | --- | --- |
| | ZnO | Al₂O₃ | BaO | Cr₂O₃ | SiO₂ | B₂O₃ | | | | | |
| 2-13 | 10 | 2.0 | 50 | 0.3 | 37 | 0.7 | 905 | 7.8 | 3100 | 2500 | −45~+40 |
| 2-14 | 15 | 1.6 | 45 | 0.5 | 37 | 0.9 | 900 | 7.9 | 2800 | 2600 | −30~+25 |
| 2-15 | 8 | 5 | 46 | 1.0 | 39 | 1.0 | 905 | 7.6 | 2500 | 2500 | −20~+20 |
| 2-16 | 10 | 1.8 | 50 | 1.5 | 36 | 0.7 | 905 | 7.8 | 3100 | 2500 | −3~+3 |
| 2-17 | 15 | 1.2 | 44 | 2.0 | 37 | 0.8 | 900 | 7.9 | 2800 | 2600 | −10~+10 |
| 2-18 | 6 | 2 | 45 | 2.5 | 44 | 0.5 | 900 | 7.4 | 3500 | 2500 | −20~+20 |
| 2-19 | 3 | 4.7 | 55 | 3.5 | 33 | 0.8 | 900 | 7.9 | 2900 | 2500 | −30~+30 |
| 2-20 | 2 | 2 | 50 | 4.0 | 46 | 1.0 | 895 | 7.3 | 2500 | 2400 | −25~+40 |
| 2-21 | 15 | 1.2 | 56 | 2.0 | 25 | 0.8 | 890 | 8.2 | 2900 | 2300 | −15~+15 |
| 2-22 | 10 | 5 | 50 | 1.5 | 33 | 0.5 | 900 | 7.9 | 3500 | 2600 | −3~+3 |
| 2-23 | 5 | 3 | 45 | 2.6 | 43 | 1.4 | 900 | 7.4 | 2500 | 2500 | −20~+20 |
| 2-24 | 3 | 8.8 | 40 | 1.0 | 46 | 1.2 | 920 | 7.6 | 2500 | 2800 | −30~+30 |
| 2-25 | 10 | 8.2 | 40 | 1.5 | 40 | 0.1 | 950 | 7.9 | 2000 | 1500 | −5~+5 |
| 2-26 | 10 | 8.2 | 40 | 1.5 | 40 | 0.3 | 900 | 7.6 | 3900 | 2800 | −3~+3 |
| 2-27 | 3 | 2.6 | 48 | 1.0 | 45 | 0.4 | 920 | 7.4 | 2500 | 2400 | −30~+30 |
| 2-28 | 7 | 5 | 50 | 2.5 | 34.6 | 0.9 | 895 | 7.8 | 2700 | 2600 | −20~+20 |
| 2-29 | 5 | 1.5 | 55 | 2.0 | 35 | 1.4 | 905 | 7.8 | 2500 | 2600 | −15~+15 |
| 2-30 | 10 | 1.3 | 50 | 2.0 | 35 | 1.7 | 900 | 7.8 | 2000 | 2700 | −15~+15 |

In Experiment Nos. 2-1 to 2-4, mainly the amount of zinc oxide was changed, the proper firing temperature is high and the Q value is high. In Experiment Nos. 2-5 to 2-8, mainly the amount of aluminum oxide was changed. In Experiment Nos. 2-9 to 2-12, mainly the amount of barium oxide was changed. In Experiment Nos. 2-13 to 2-20, mainly the amount of chromium oxide was changed. In Experiment Nos. 2-13 and 2-20, the absolute value of τf is large. In Experiment Nos. 2-21 to 2-24, mainly the amount of silicon oxide was changed. As the amount of silicon oxide is decreased, the dielectric constant ∈r tends to rise. In Experiment Nos. 2-24 to 2-30, mainly the amount of boron oxide was changed. As the amount of the boron oxide is decreased, the proper firing temperature rises and the quality coefficient Q largely increases.

Next, a coefficient of thermal expansion (/° C.) was measured at 25 to 800° C. with respect to each of the experimental samples.

A green sheet for another, second low temperature-firing porcelain article to be joined was prepared, which had a composition of 10 wt % of ZnO, 2.0 wt % of Al2O3, 50 wt % of BaO, 0.3 wt % of Cr2O3, 37 wt % of $SiO_2$ and 0.7 wt % of B2O3. A predetermined number of such green sheets were laminated, the laminate was fired at 920° C., and the fired body worked, thereby obtaining an experimental sample. With respect to this experimental sample, a coefficient of thermal expansion (/° C.) was measured in a range of 25 to 800° C. A difference in coefficient of thermal expansion between the low temperature-fired porcelain article in each Experimental sample according to the present invention and said another low temperature-fired porcelain article to be joined thereto was measured.

With respect to each of the green sheets in Experiment Nos. 2-1 to 2-30 in Tables 3 and 4 and the green sheet for another low temperature-fired porcelain article to be joined thereto, a firing shrinkage factor between room temperature and 800° C. was measured by a dilatometer, and the maximum difference in the firing shrinkage ratio was measured. The green sheet in each of Experiment Nos. 2-1 to 2-30 was laminated with the corresponding green sheet for another low temperature-fired porcelain article to be joined thereto, and the laminate was fired at 850 to 930° C. to obtain a sintered laminate body. With respect to each of the thus sintered laminate bodies, the presence of warping and cracking and peeling at an interface of the laminated layers was measured. Results obtained are shown in Tables 5 and 6.

TABLE 5

| Experiment No. | Content (wt %) | | | | | | Difference in coefficient of thermal expansion ppm/° C. | Difference in shrinkage factor during firing step (%) | Warping μm/cm | Cracking |
|---|---|---|---|---|---|---|---|---|---|---|
| | ZnO | Al$_2$O$_3$ | BaO | Cr$_2$O$_3$ | SiO$_2$ | B$_2$O$_3$ | | | | |
| 2-1 | 1.2 | 8 | 44 | 2.5 | 43 | 1.3 | 1.9 | 1.9 | 10 | not cracked |
| 2-2 | 4 | 4 | 50 | 1.5 | 39.5 | 1.0 | 1.3 | 1.5 | 8 | not cracked |
| 2-3 | 10 | 2.2 | 47 | 2.0 | 38 | 0.8 | 0.5 | 0.5 | 5 | not cracked |
| 2-4 | 20 | 2 | 45 | 1.0 | 31 | 1.0 | −0.5 | 1.0 | 5 | not cracked |
| 2-5 | 10 | 0.1 | 50 | 1.0 | 37.6 | 1.3 | 0.5 | 1.0 | 5 | not cracked |
| 2-6 | 8 | 1 | 48 | 2.5 | 39.6 | 0.9 | 0.7 | 0.5 | 6 | not cracked |
| 2-7 | 6 | 10 | 45 | 2.0 | 36.2 | 0.8 | 1.0 | 0.7 | 7 | not cracked |
| 2-8 | 4 | 15 | 44 | 1.5 | 35 | 0.5 | 1.3 | 1.1 | 8 | not cracked |
| 2-9 | 7 | 7.6 | 40 | 1.0 | 43 | 1.4 | 0.8 | 1.5 | 7 | not cracked |
| 2-10 | 5 | 6.1 | 46 | 2.0 | 40 | 0.9 | 1.2 | 0.9 | 8 | not cracked |
| 2-11 | 3 | 2.7 | 55 | 2.5 | 36 | 0.8 | 1.5 | 1.3 | 9 | not cracked |
| 2-12 | 2 | 1 | 65 | 1.5 | 30 | 0.5 | 1.8 | 1.6 | 9 | not cracked |

TABLE 6

| Experiment No. | Content (wt %) | | | | | | Difference in coefficient of thermal expansion ppm/° C. | Difference in shrinkage factor during firing step (%) | Warping μm/cm | Cracking |
|---|---|---|---|---|---|---|---|---|---|---|
| | ZnO | Al$_2$O$_3$ | BaO | Cr$_2$O$_3$ | SiO$_2$ | B$_2$O$_3$ | | | | |
| 2-13 | 10 | 2.0 | 50 | 0.3 | 37 | 0.7 | 0.5 | 1.4 | 5 | not cracked |
| 2-14 | 15 | 1.6 | 45 | 0.5 | 37 | 0.9 | 0.0 | 1.7 | 8 | not cracked |
| 2-15 | 8 | 5 | 46 | 1.0 | 39 | 1.0 | 0.7 | 0.5 | 6 | not cracked |
| 2-16 | 10 | 1.8 | 50 | 1.5 | 36 | 0.7 | 0.5 | 1.2 | 9 | not cracked |
| 2-17 | 15 | 1.2 | 44 | 2.0 | 37 | 0.8 | 0.0 | 0.9 | 8 | not cracked |
| 2-18 | 6 | 2 | 45 | 2.5 | 44 | 0.5 | 1.0 | 0.7 | 5 | not cracked |
| 2-19 | 3 | 4.7 | 55 | 3.5 | 33 | 0.8 | 1.5 | 1.1 | 5 | not cracked |
| 2-20 | 2 | 2 | 50 | 4.0 | 46 | 1.0 | 1.8 | 1.6 | 7 | not cracked |
| 2-21 | 15 | 1.2 | 56 | 2.0 | 25 | 0.8 | 0.8 | 1.7 | 9 | not cracked |
| 2-22 | 10 | 5 | 50 | 1.5 | 33 | 0.5 | 0.5 | 0.7 | 8 | not cracked |
| 2-23 | 5 | 3 | 45 | 2.6 | 43 | 1.4 | 1.2 | 0.5 | 7 | not cracked |
| 2-24 | 3 | 8.8 | .40 | 1.0 | 46 | 1.2 | 1.2 | 1.3 | 9 | not cracked |
| 2-25 | 10 | 8.2 | 40 | 1.5 | 40 | 0.1 | 0.5 | 1.7 | 6 | not cracked |
| 2-26 | 10 | 8.2 | 40 | 1.5 | 40 | 0.3 | 0.5 | 1.6 | 6 | not cracked |
| 2-27 | 3 | 2.6 | 48 | 1.0 | 45 | 0.4 | 1.5 | 0.5 | 8 | not cracked |
| 2-28 | 7 | 5 | 50 | 2.5 | 34.6 | 0.9 | 0.8 | 1.6 | 5 | not cracked |
| 2-29 | 5 | 1.5 | 55 | 2.0 | 35 | 1.4 | 1.2 | 1.3 | 7 | not cracked |
| 2-30 | 10 | 1.3 | 50 | 2.0 | 35 | 1.7 | 1.2 | 0.5 | 7 | not cracked |

As shown above, when the sintered laminate body is produced by using the low temperature-fired porcelain article according to the second aspect of the present invention, none of warping, peeling and cracking occur.

As mentioned above, according to the second aspect of the present invention, the $BaO$—$SiO_2$—$Al_2O_3$ based low temperature-fired porcelain article having the dielectric constant $\in r$ of not more than 10, the quality coefficient Q of not less than 2500 and the absolute value of the temperature coefficient τf of the resonance frequency of not more than 30 ppm/° C. with high strength can be obtained.

What is claimed is:

1. A low temperature-fired porcelain article comprising a barium component in an amount of 40 to 65 wt % when calculated as BaO, a silicon component in an amount of 25 to 46 wt % when calculated as $SiO_2$, an aluminum component in an amount of 0.1 to 20 wt % when calculated as $Al_2O_3$, a boron component in an amount of 0.3 to 1.5 wt % when calculated as $B_2O_3$, and a zinc component in an amount of 0.5 to 20 wt % when calculated as ZnO, wherein the porcelain article has a dielectric constant $\in r$ of not more than 10, and a quality coefficient Q of not less than 2500, wherein a glass comprising $SiO_2$, $B_2O_3$ and ZnO is used as a part of starting materials for the porcelain article.

2. An electronic part comprising the low temperature-fired porcelain article claimed in claim 1.

3. An electronic part comprising a first low dielectric constant layer made of the low temperature-fired porcelain article claimed in claim 2, and a second dielectric layer joined to the first dielectric layer, wherein the second dielectric layer has a dielectric constant $\in r$ of 10 to 150 which is larger than that of the first layer.

4. The electronic part set forth in claim 3, wherein the second dielectric layer has a composition selected from the group consisting of $BaO$—$TiO_2$—$ZnO$—$SiO_2$—$B_2O_3$, $BaO$—$TiO_2$—$Bi_2O_3$—$Nd_2O_3$—$ZnO$—$SiO_2$—$B_2O_3$, $BaO$—$TiO_2$—$Bi_2O_3$—$La_2O_3$—$Sm_2O_3$—$ZnO$—$SiO_2$—$B_2O_3$, and $MgO$—$CaO$—$TiO_2$—$ZnO$—$Al_2O_3$—$SiO_2$—$B_2O_3$.

5. A low temperature-fired porcelain article comprising a barium component in an amount of 40 to 65 wt % when calculated as BaO, a silicon component in an amount of 25 to 46 wt % when calculated as $SiO_2$, an aluminum component in an amount of 0.1 to 20 wt % when calculated as $Al_2O_3$, a boron component in an amount of 0.3 to 1.5 wt % when calculated as $B_2O_3$, a zinc component in an amount of 0.5 to 20 wt % when calculated as ZnO, and a chromium component in an amount of 0.5 to 3.5 wt % when calculated as $Cr_2O_3$, wherein the porcelain article has a dielectric constant $\in r$ of not more than 10, a quality coefficient Q of not less than 2500, and an absolute value of a temperature coefficient τf of the resonance frequency of not more than 30 ppm/° C., wherein a glass comprising $SiO_2$, $B_2O_3$ and ZnO is used as a part of starting materials for the porcelain article.

6. An electric part comprising the low temperature-fired porcelain article claimed in claim 5.

7. An electronic part comprising a first low dielectric constant layer made of the low temperature-fired porcelain article claimed in claim 6, and a second dielectric layer joined to the first dielectric layer, wherein the second dielectric layer has a dielectric constant $\in r$ of 10 to 150 which is larger than that of the first layer.

8. The electronic part set forth in claim 7, wherein the second dielectric layer has a composition selected from the group consisting of $BaO$—$TiO_2$—$ZnO$—$SiO_2$—$B_2O_3$, $BaO$—$TiO_2$—$Bi_2O_3$—$Nd_2O_3$—$ZnO$—$SiO_2$—$B_2O_3$, $BaO$—$TiO_2$—$Bi_2O_3$—$La_2O_3$—$Sm_2O_3$—$ZnO$—$SiO_2$—$B_2O_3$, and $MgO$—$CaO$—$TiO_2$—$ZnO$—$Al_2O_3$—$SiO_2$—$B_2O_3$.

\* \* \* \* \*